US009363330B2

(12) United States Patent
Chetlur et al.

(10) Patent No.: US 9,363,330 B2
(45) Date of Patent: Jun. 7, 2016

(54) SYSTEMS AND METHODS FOR MANAGED SERVICE DELIVERY IN 4G WIRELESS NETWORKS

(75) Inventors: Malolan Chetlur, Karnataka (IN); Umamaheswari C. Devi, Bangalore (IN); Partha Dutta, Bangalore (IN); Sumedh W. Sathaye, Austin, TX (US); Shivkumar Kalyanaraman, Vibhutipura (IN)

(73) Assignee: International Business Machines Corporation, Armonk, NY (US)

( * ) Notice: Subject to any disclaimer, the term of this patent is extended or adjusted under 35 U.S.C. 154(b) by 873 days.

(21) Appl. No.: 12/824,800

(22) Filed: Jun. 28, 2010

(65) Prior Publication Data

US 2011/0321054 A1    Dec. 29, 2011

(51) Int. Cl.
     *G06F 9/46*      (2006.01)
     *H04L 29/08*      (2006.01)
     *G06Q 10/10*      (2012.01)

(52) U.S. Cl.
     CPC .............. *H04L 67/322* (2013.01); *G06Q 10/10* (2013.01)

(58) Field of Classification Search
None
See application file for complete search history.

(56) References Cited

U.S. PATENT DOCUMENTS

| 6,857,020 | B1 | 2/2005 | Chaar et al. |
| 7,369,498 | B1 | 5/2008 | Ma et al. |
| 7,656,882 | B2 | 2/2010 | Ji et al. |
| 8,090,611 | B2* | 1/2012 | Hodges et al. ............... 705/7.27 |
| 2002/0156904 | A1 | 10/2002 | Gullotta et al. |
| 2006/0224432 | A1 | 10/2006 | Li |
| 2008/0008188 | A1 | 1/2008 | Buga et al. |
| 2008/0040630 | A1 | 2/2008 | Travostino et al. |
| 2008/0049787 | A1 | 2/2008 | McNaughton et al. |
| 2008/0068445 | A1 | 3/2008 | Rockefeller et al. |
| 2010/0002692 | A1 | 1/2010 | Bims |
| 2010/0085917 | A1 | 4/2010 | Gorokhov et al. |
| 2011/0067030 | A1* | 3/2011 | Isard et al. .................... 718/102 |

FOREIGN PATENT DOCUMENTS

WO      WO03009560      1/2003

OTHER PUBLICATIONS

Jahnert, Jurgen, et al, "The 'pure-IP' Moby Dick 4G architecture", Computer Communication 28 (2004), copyright 2004 Elsevier B.V., available at URL:http://www.sciencedirect.com/science, as of Dec. 20, 2004.

Mobile Broadband Driving Change—Challenges and Opportunities, available at URL:http://www.tellabs.com/services/tlab_npm_ov.pdf, as of Apr. 2010.

4G & Smart Objects, available at URL:http://vertoda.wordpress.com, as of Apr. 19, 2010 17:46.

(Continued)

*Primary Examiner* — Gregory A Kessler
(74) *Attorney, Agent, or Firm* — Ference & Associates LLC

(57) ABSTRACT

Systems and methods for managed service delivery at the edge in 4G wireless networks for: dynamic QoS (Quality of Service) provisioning and prioritization of sessions based on the task (current, future) of the workflow instance; predicting the current and future network requirements based on the current and future tasks of all business process sessions and prepare session QoS accordingly; providing an audit trail of business process execution; and reporting on business process execution.

11 Claims, 7 Drawing Sheets

(56) References Cited

OTHER PUBLICATIONS

Operax and DMX Technologies Sign Strategic Partnership, available at URL:http://www.ossnewsreview.com/telecom-oss/operax-and-dmx-technologies-sign-strategic-partnership/, as of Apr. 19, 2010 17:51.

WiBAS, Advanced broadband wireless solutions, available at URL:http://www.sitronics.com/upload/iblock/ce3/wibas.pdf, as of Apr. 2010.

Lawful Interception for 3G and 4G Networks, White Paper, Mar. 2010, Aqsacom Document No. 100458, available at URL:http://www.aqsacomna.com/us/articles/Aqsacom_White_paper_4G_LI_v1.pdf.

Yuan, Soe-Tsyr and Lin, Kwei-Jay, "WISE-building simple intelligence into Web services", Department of Management, Inf. Syst., Nat. Chengchi Univ., Taipei, Taiwan, Web Intelligence, 2003, WI 2003. Proceedings, IEEE/WIC International Conference on Publication Date: Oct. 13-17, 2003, On pp. 26-32.

Moorsel, Aad Van, Metrics for the Internet Age: Quality of Experience and Quality of Business, Technical Report HLP-2001-179, HP Labs, Aug. 2001, also published in 5th Performability Workshop, Sep. 2001, Erlangen, Germany.

PCT International Search Report (Forms PCT/ISA/220 and 210), PCT/EP2011/059309, International Searching Authority/European Patent Office, Oct. 27, 2011, 4 pages.

* cited by examiner

SYSTEMS AND METHODS FOR MANAGED SERVICE DELIVERY IN 4G WIRELESS NETWORKS

BACKGROUND

Conventionally, techniques are not available for managing service flows pertaining to business process execution. Such service flows are normally categorized as Best Effort (BE) flow or another high priority flow, and the priority normally varies with the state of the workflow instance. With the advent of 4G wireless networks in the realm of business process execution, the sheer volume of data to transfer and tasks to manage can potentially overwhelm conventional business process management arrangements.

BRIEF SUMMARY

In summary, one aspect of the invention provides a method comprising: detecting an event in a wireless network; employing a service appliance in the wireless network to perform: associating the event with a task; assimilating the task into a pool of tasks; and constructing a workflow session respective to the pool of tasks; said constructing comprising assigning priority to each task and arranging the tasks in accordance with the priorities; and accommodating data subsequent to the workflow session as learning for future workflow sessions.

Another aspect of the invention provides an apparatus comprising: one or more processors; and a computer readable storage medium having computer readable program code embodied therewith and executable by the one or more processors, the computer readable program code comprising: computer readable program code configured to detect an event; computer readable program code configured to associate the event with a task; computer readable program code configured to assimilate the task into a pool of tasks; computer readable program code configured to construct a workflow session respective to the pool of tasks; computer readable program code further configured to assign priority to each task and arranging the tasks in accordance with the priorities; and computer readable program code configured to accommodate data subsequent to the workflow session as learning for future workflow sessions.

An additional aspect of the invention provides a computer program product comprising: a computer readable storage medium having computer readable program code embodied therewith, the computer readable program code comprising: computer readable program code configured to detect an event; computer readable program code configured to associate the event with a task; computer readable program code configured to assimilate the task into a pool of tasks; computer readable program code configured to construct a workflow session respective to the pool of tasks; computer readable program code further configured to assign priority to each task and arranging the tasks in accordance with the priorities; and computer readable program code configured to accommodate data subsequent to the workflow session as learning for future workflow sessions.

For a better understanding of exemplary embodiments of the invention, together with other and further features and advantages thereof, reference is made to the following description, taken in conjunction with the accompanying drawings, and the scope of the claimed embodiments of the invention will be pointed out in the appended claims.

DETAILED DESCRIPTION

Figure 1:
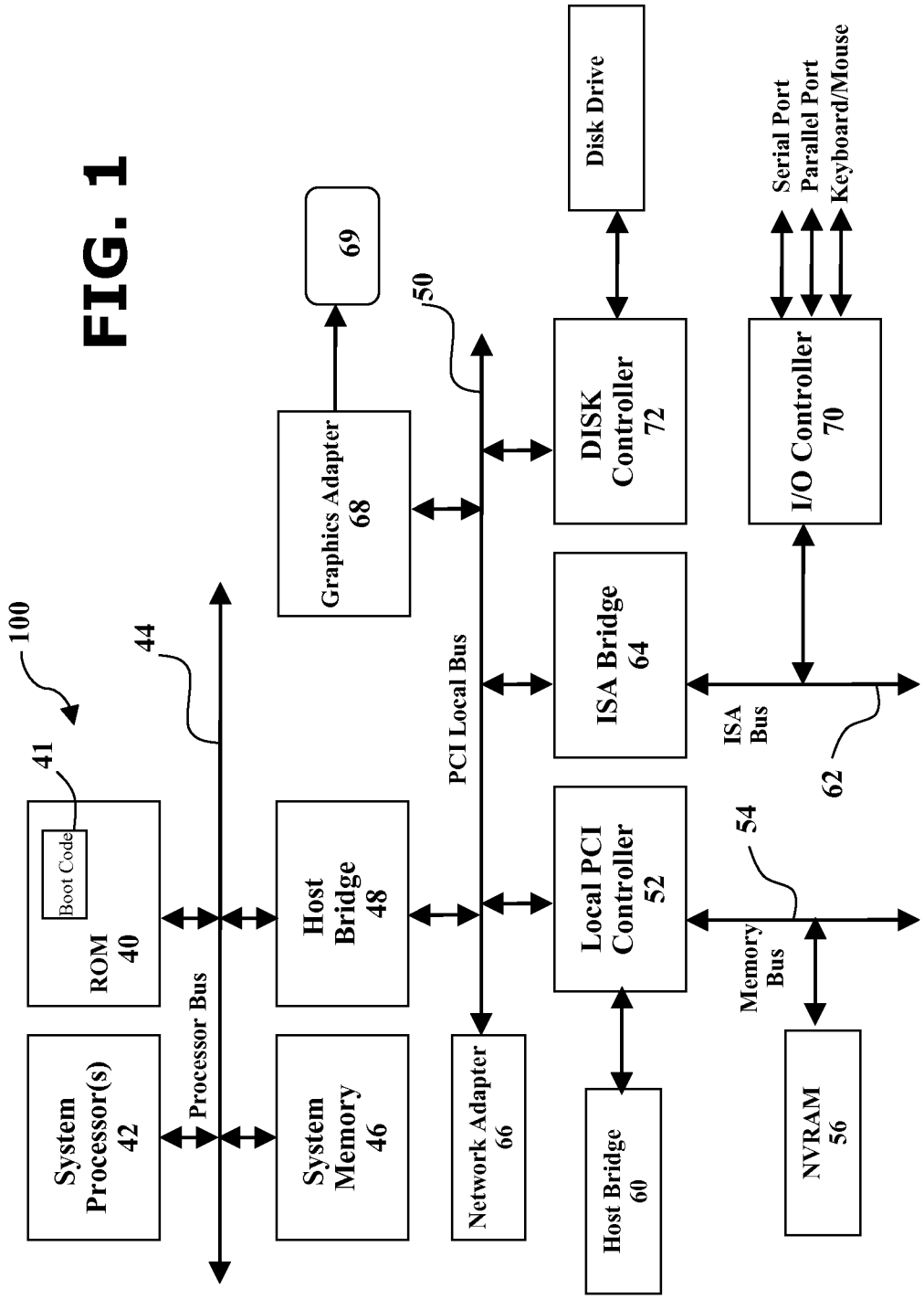
FIG. 1 illustrates a computer system.

It will be readily understood that the components of the embodiments of the invention, as generally described and illustrated in the figures herein, may be arranged and designed in a wide variety of different configurations in addition to the described exemplary embodiments. Thus, the following more detailed description of the embodiments of the invention, as represented in the figures, is not intended to limit the scope of the embodiments of the invention, as claimed, but is merely representative of exemplary embodiments of the invention.

Reference throughout this specification to "one embodiment" or "an embodiment" (or the like) means that a particular feature, structure, or characteristic described in connection with the embodiment is included in at least one embodiment of the invention. Thus, appearances of the phrases "in one embodiment" or "in an embodiment" or the like in various places throughout this specification are not necessarily all referring to the same embodiment.

Furthermore, the described features, structures, or characteristics may be combined in any suitable manner in one or more embodiments. In the following description, numerous specific details are provided to give a thorough understanding of embodiments of the invention. One skilled in the relevant art will recognize, however, that the various embodiments of the invention can be practiced without one or more of the specific details, or with other methods, components, materials, et cetera. In other instances, well-known structures, materials, or operations are not shown or described in detail to avoid obscuring aspects of the invention.

The description now turns to the figures. The illustrated embodiments of the invention will be best understood by reference to the figures. The following description is intended only by way of example and simply illustrates certain selected exemplary embodiments of the invention as claimed herein.

It should be noted that the flowchart and block diagrams in the figures illustrate the architecture, functionality, and operation of possible implementations of systems, apparatuses, methods and computer program products according to various embodiments of the invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Referring now to FIG. 1, there is depicted a block diagram of an illustrative embodiment of a computer system 100. The illustrative embodiment depicted in FIG. 1 may be an electronic device such as a laptop or desktop personal computer or server, a mobile/smart phone or the like. As is apparent from the description, however, the embodiments of the invention may be implemented in any appropriately configured device, as described herein.

As shown in FIG. 1, computer system 100 includes at least one system processor 42, which is coupled to a Read-Only Memory (ROM) 40 and a system memory 46 by a processor bus 44. System processor 42, which may comprise one of the AMD line of processors produced by AMD Corporation or a processor produced by INTEL Corporation, is a general-purpose processor that executes boot code 41 stored within ROM 40 at power-on and thereafter processes data under the control of an operating system and application software stored in system memory 46. System processor 42 is coupled via processor bus 44 and host bridge 48 to Peripheral Component Interconnect (PCI) local bus 50.

PCI local bus 50 supports the attachment of a number of devices, including adapters and bridges. Among these devices is network adapter 66, which interfaces computer system 100 to LAN, and graphics adapter 68, which interfaces computer system 100 to display 69. Communication on PCI local bus 50 is governed by local PCI controller 52, which is in turn coupled to non-volatile random access memory (NVRAM) 56 via memory bus 54. Local PCI controller 52 can be coupled to additional buses and devices via a second host bridge 60.

Computer system 100 further includes Industry Standard Architecture (ISA) bus 62, which is coupled to PCI local bus 50 by ISA bridge 64. Coupled to ISA bus 62 is an input/output (I/O) controller 70, which controls communication between computer system 100 and attached peripheral devices such as a keyboard, mouse, serial and parallel ports, et cetera. A disk controller 72 connects a disk drive with PCI local bus 50. The USB Bus and USB Controller (not shown) are part of the Local PCI controller (52).

Broadly contemplated herein, in accordance with at least one embodiment of the invention, are systems and methods for managed service delivery at the edge in 4G wireless networks (that is, the edge refers to access network that is closer to the user and not the core network) for: dynamic QoS (Quality of Service) provisioning and prioritization of sessions based on the task (current, future) of the workflow instance; predicting the current and future network requirements based on the current and future tasks of all business process sessions and preparing session QoS accordingly. This invention is not limited to the edge of the network and can be applied to other parts of the network namely the core and endpoints of the business process sessions.

Also broadly contemplated herein, in accordance with at least one embodiment of the invention, are providing an audit trail of business process execution and reporting on business process execution. Such measures can be applied similarly to dynamic QoS provisioning as mentioned above, as an alternative or adjunct to dynamic QoS provisioning.

Generally speaking, it should be noted that the management of business process sessions is a complex task and especially will become so in the context of 4G wireless broadband networks. In the context of several coincident business process sessions, there is broadly contemplated, in accordance with embodiments of the invention, a prioritization among sessions to manage scarce wireless resource and increase value per wireless bit.

Generally, in accordance with at least one embodiment of the invention, related business process sessions are identified and associated. These are then prioritized based on their workflow state (i.e., the current step in the workflow, the conditions met and states traversed so far to reach the current step and the priority of the current and future steps). Current workflow states and next states are used to appropriately predict and plan for future requirements. Important Tasks or events, specified as input, that are identified by a service appliance trigger a business/service layer for business process management functions, which in turn triggers a monitoring system for managing sessions.

The disclosure now turns to FIGS. 2-6. It should be appreciated that the processes, arrangements and products broadly illustrated therein can be carried out on or in accordance with essentially any suitable computer system or set of computer systems, which may, by way of an illustrative and non-restrictive example, include a system such as that indicated at 100 in FIG. 1. In accordance with an example embodiment, most if not all of the process steps, components and outputs discussed with respect to FIGS. 2-7 (apart from external components such as mobile station wireless devices) can be performed or utilized by way of system processors and system memory such as those indicated, respectively, at 42 and 46 in FIG. 1.

Figure 2:
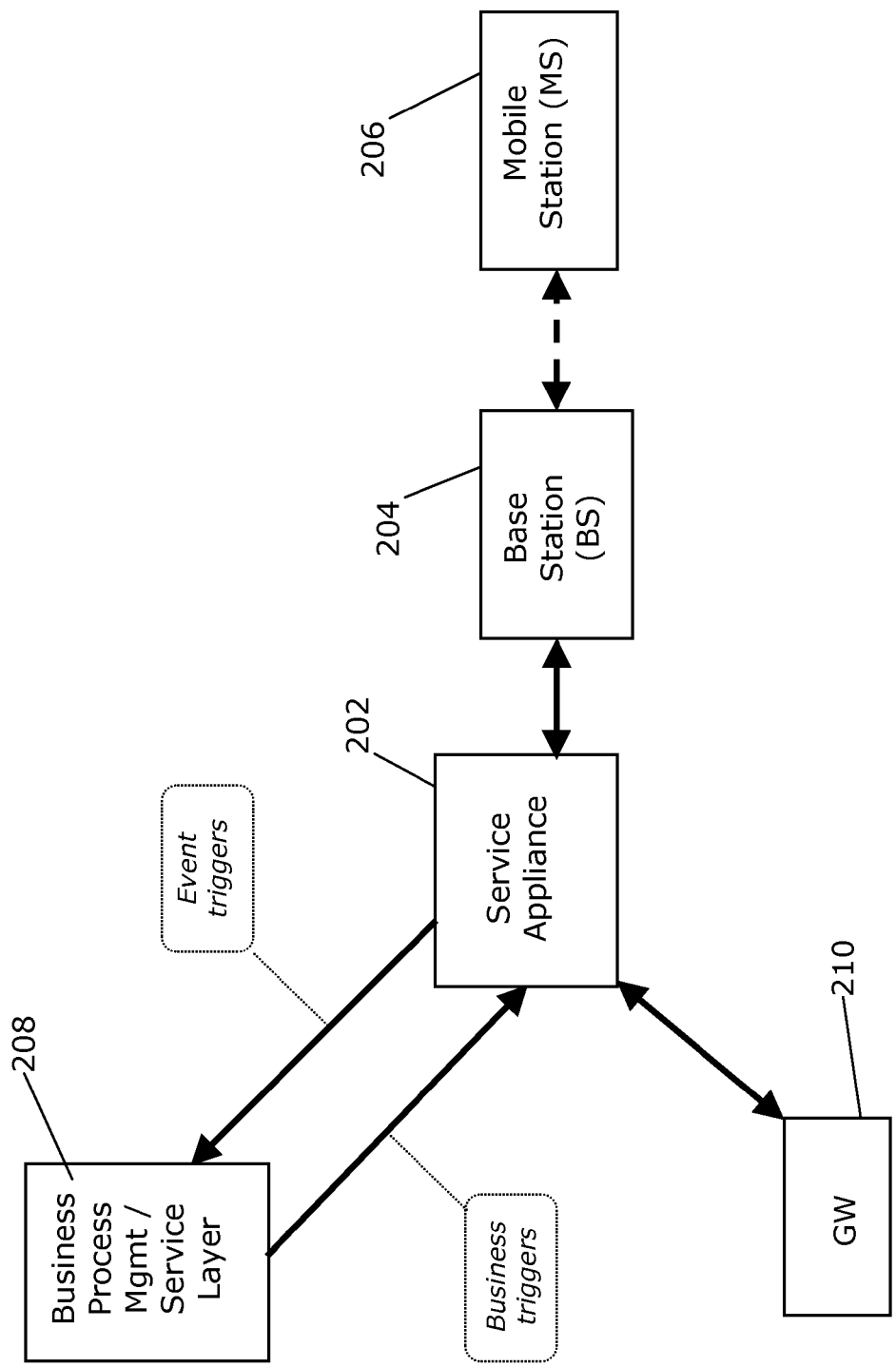
FIG. 2 shows a general overview of components relating to at least one embodiment of the invention.

FIG. 2 shows a general overview of components relating to at least one embodiment of the invention. As shown in FIG. 2, a service appliance 202 is in communication with a base station (BS) 204, itself in communication with a mobile station (MS) 206. Further, service appliance 202 is in communication with a Network Gateway (GW) 210 as well as with a business process/management layer 208. As is generally known, and in at least one embodiment of the invention here, GW 210 serves to aggregate individual connections and interfaces to the core or wide area part of the network. In at least one embodiment of the invention, and as will be further appreciated from the ensuing discussion, GW 210 serves a typical wireless infrastructure function of managing a group of base stations and providing QoS, mobility and security functions. In a manner to be understood more fully below, service appliance 202 transmits event triggers to business process/management layer 208 and receives there from business triggers.

Figure 3:
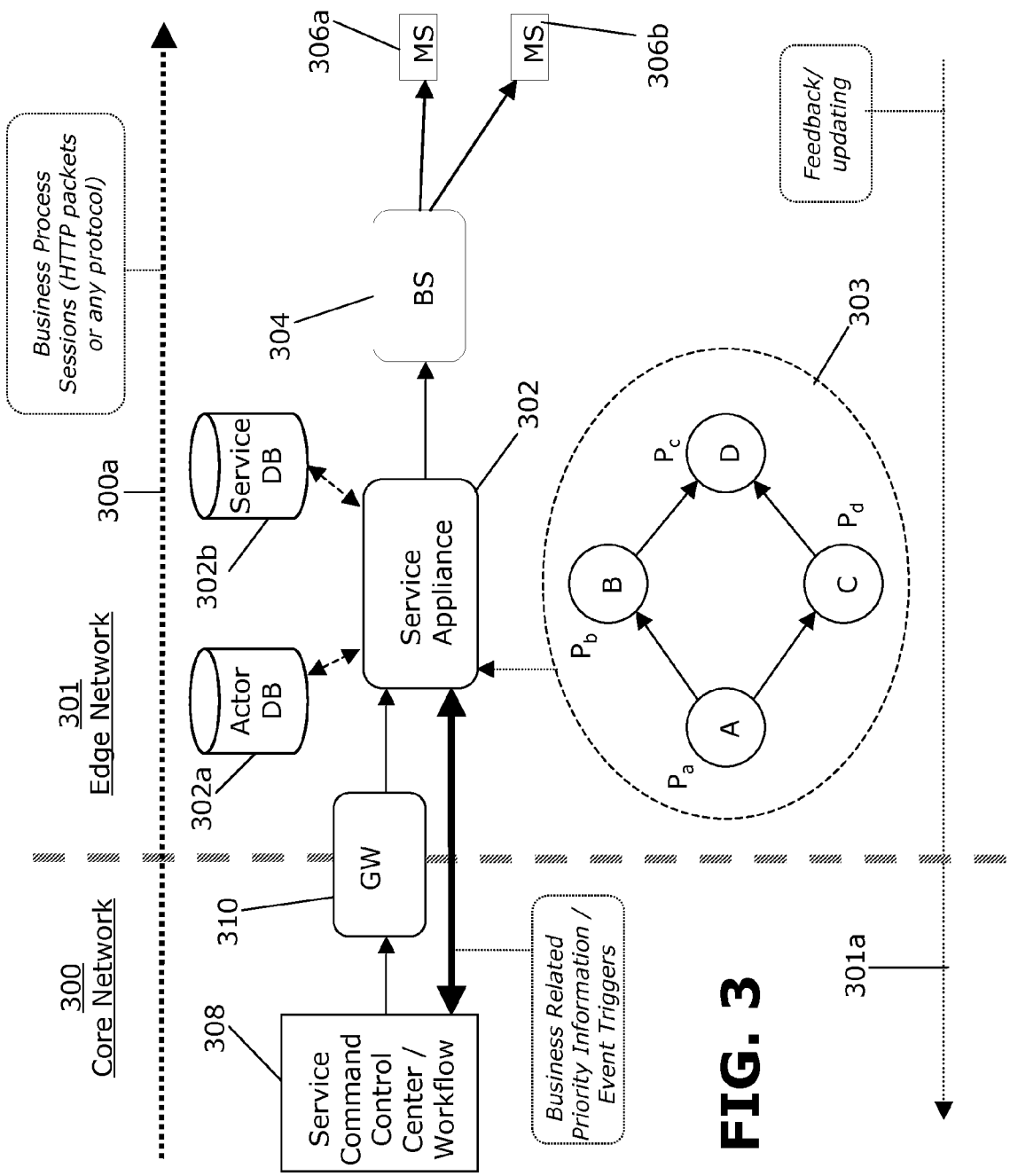
FIG. 3 shows in more detail a schematic depiction of components relating to at least one embodiment of the invention.

FIG. 3 shows in more detail a schematic depiction of components relating to at least one embodiment of the invention. Components substantially analogous to those found in FIG. 2 bear reference numerals advanced by 100.

In accordance with embodiments of the invention, service appliance 302 is in communication with a service command and control center 308, which carries out workflow in a manner to be described. GW 310 is communicatively interposed between service command/control center 308 and service appliance 302, with business-related priority information and event triggers also being communicated between service command/control center 308 and service appliance 302 (similarly to the functional relationship shown between service appliance 202 and business process management/service layer 208 of FIG. 2).

A general process flow can be appreciated between a core network 300 and an edge network 301. Core network 300 includes the service command control center 308 while the edge network includes service appliance 302, base station 304 and mobile stations 306a/b. GW 310 essentially bridges these two networks 300/301. A general process flow 300a from core network 300 to edge network 301 involves business process sessions (which may be in the form of HTTP packets or any protocol) while a reverse general process flow 301a from edge network 301 to core network 300 involves feedback and updating by way of changing workflow parameters. Such feedback can also of course serve to update other elements such as actor/service databases 302a/b to be described below. These very general process flows 300a/301a will be more fully understood and appreciated from the ensuing discussion.

In accordance with embodiments of the invention, the mechanics of workflow are manifested in a Directed Acyclic Graph (DAG) 303, with the nodes of the DAG (here, A, B, C and D) representing tasks or activities. While only four tasks are shown and considered here, of course a greater number of tasks are conceivable within the scope of embodiments of the invention. In accordance with embodiments of the invention, the service appliance 202 develops the DAG 303 by way of prioritizing tasks and allocating resources, and thereby obviating a severe throttling of efficiency that might otherwise occur without such measured prioritization and allocation.

Essentially, in accordance with embodiments of the invention, DAG 303 is an abstract representation of an underlying business process. DAG 303 serves as an abstract representation capturing the tasks, their dependencies, priorities, the actors or personnel responsible for each tasks in a concise format. In embodiments of the invention, DAG 303 is provided as input in the context of the business process under consideration, wherein optimizations and ordering are captured as part of this input in the form of DAG 303.

In accordance with at least one embodiment of the invention, each of the tasks A/B/C/D are characterized by any of a variety of pertinent factors. Such factors may include, but of course need not be limited to payload size, media type, permitted delay or latency, "timeout"; priority of the task ($P_t$); frequency of the task to be executed; and QoS requirements for the task. In embodiments of the invention, media type refers to voice, video, data, etc., and "timeout" refers to a maximum time available to complete a step. In embodiments of the invention, each task in the DAG 203 has its own requirements in terms of the information (payload) used or created, priority, actors or humans performing the task etc. Also, these tasks have dependencies resulting, in the example shown, in task A followed by B and C more or less concurrently, followed by task D. The implication is, as the requirement and conditions of the task changes, their underlying network QoS requirements also change and need to be accommodated for efficient delivery.

In embodiments of the invention, service appliance 302 includes or has access to two databases, namely, actor database (DB) 302a and service DB 302b. Actor DB 302a contains information and data about actors available to carry out tasks 302a and service DB 302b contains information and data about the tasks themselves. Both can be updated manually and/or automatically pursuant to tasks carried out and to feedback received from the execution of such tasks.

By way of a non-restrictive and illustrative example in accordance with sample embodiments of the invention, the aforementioned actors are in the form of a mobile operational workforce, and individual actors each include or have access to a mobile station 306a/b such as in a 4G wireless network. (While only two mobile stations 306a/b are shown here, it of course should be appreciated that this number is provided merely by way of example and that a larger number of actors and attendant mobile stations are of course conceivable.) Communication between base station 304 and mobile stations 306a/b, in an example, may be via an 802.16 interface or essentially any other suitable interface. By way of organizing information and data, in accordance with at least one embodiment of the invention, the service appliance 302 serves to consolidate information/data on actors as characterized by the MSID (Mobile Station ID) 306a/b of the actor or IP address of the actor and/or the task executed. In accordance with at least one embodiment of the invention, a service or activity step is characterized or identified by the IP address and port of the web service, and/or the media type of the sessions.

Figure 4:
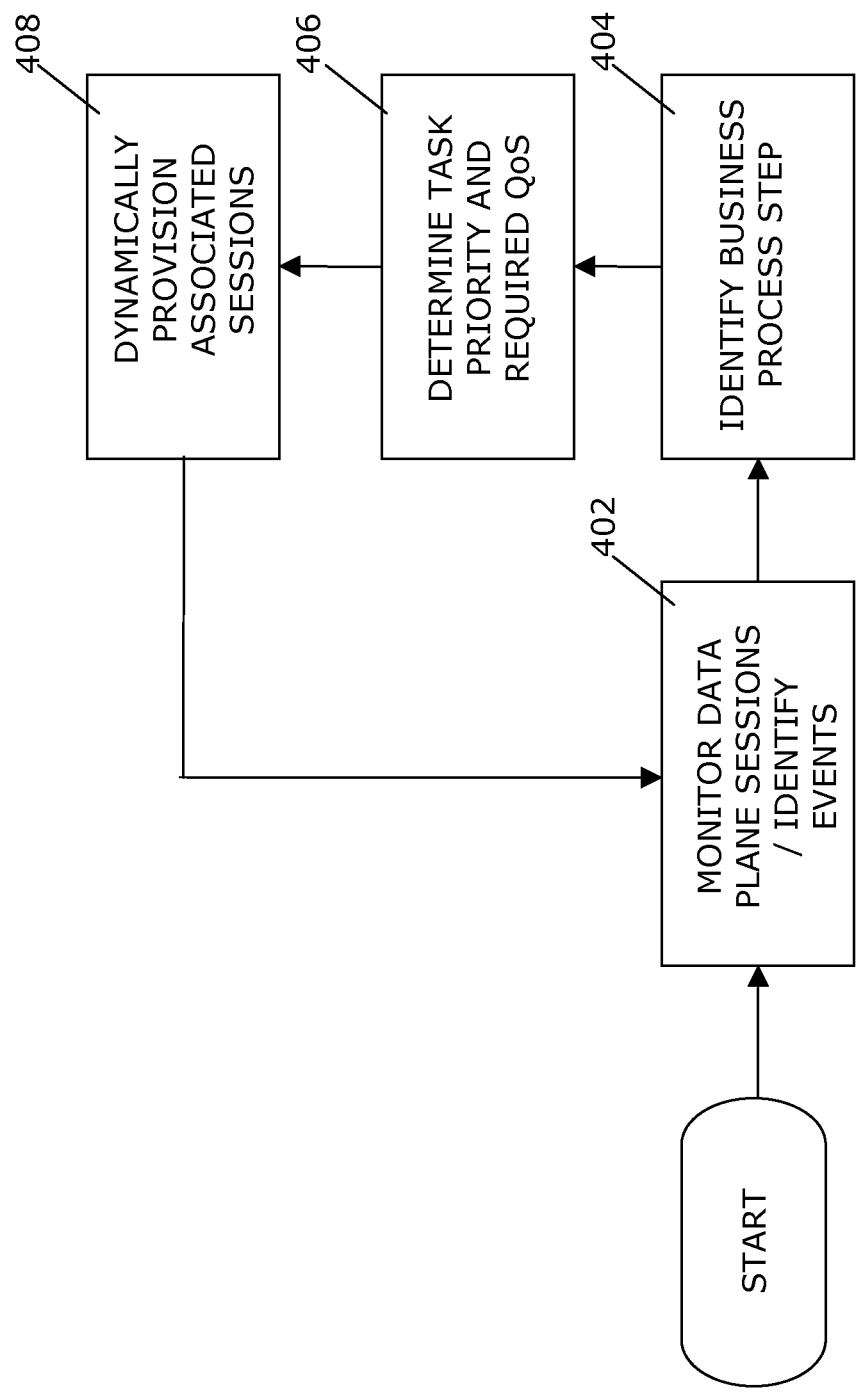
FIG. 4 illustrates a general process of business process execution in accordance with a workflow session, pursuant to at least one embodiment of the invention.

FIG. 4 illustrates a general process of business process execution in accordance with a workflow session. In accordance with embodiments of the invention, business process execution is managed by service appliance 302 via using a workflow abstraction employing the DAG 303 mentioned above (see FIG. 3). In a first step, sessions of the control plane or data plane or both (to be better understood and appreciated further below) are monitored and events, as understood in accordance with embodiments of the invention (as understood in the discussion herein) are identified. Input for this step, which can also be learned during the lifetime of the workflow sessions, is provided in embodiments of the invention via any and all of the following: the DAG (abstract representation of workflow) 303 itself; (see FIG. 3) task attributes (e.g., priority, payload size, media type, latency, timeout, frequency); actors (e.g., human activities and associated 4G IP devices 306a/b with their MSID and IP Address; see FIG. 3); and service endpoint (e.g., IP address and port number of the service of a specific workflow step). (It should be understood that a service endpoint, as understood in accordance with at least one embodiment of the invention, refers to an endpoint or location where a process is undertaken in connection with a worker or other individual associated with a given MS 306a/b as shown in FIG. 3.)

Next, a business process step is detected or learned in execution of the workflow session and associated flows (404). Such identification can be carried out on any or all of at least the following bases: a DAG representation of workflow, IP Address, MSID etc.; the type of media of the session; the service address; the actor or the actor's MSID; the content of the session (SOAP messages). (Typically, service address are the URL of webservices and the webservices employ SOAP protocols. SOAP is but one example of where the service information of the business process can arrive from.)

Next (406), in embodiments of the invention, task priority is determined and QoS requirements for the related flows of the sessions and specific business related timing constraints are identified from the identified step and task specifications given as input from step 404. Again, in embodiments of the invention, priority or order is derived from the underlying business process and decided as part of the business process analysis; here, it is given as input to the system via DAG 303 (see FIG. 3)

Figure 5:
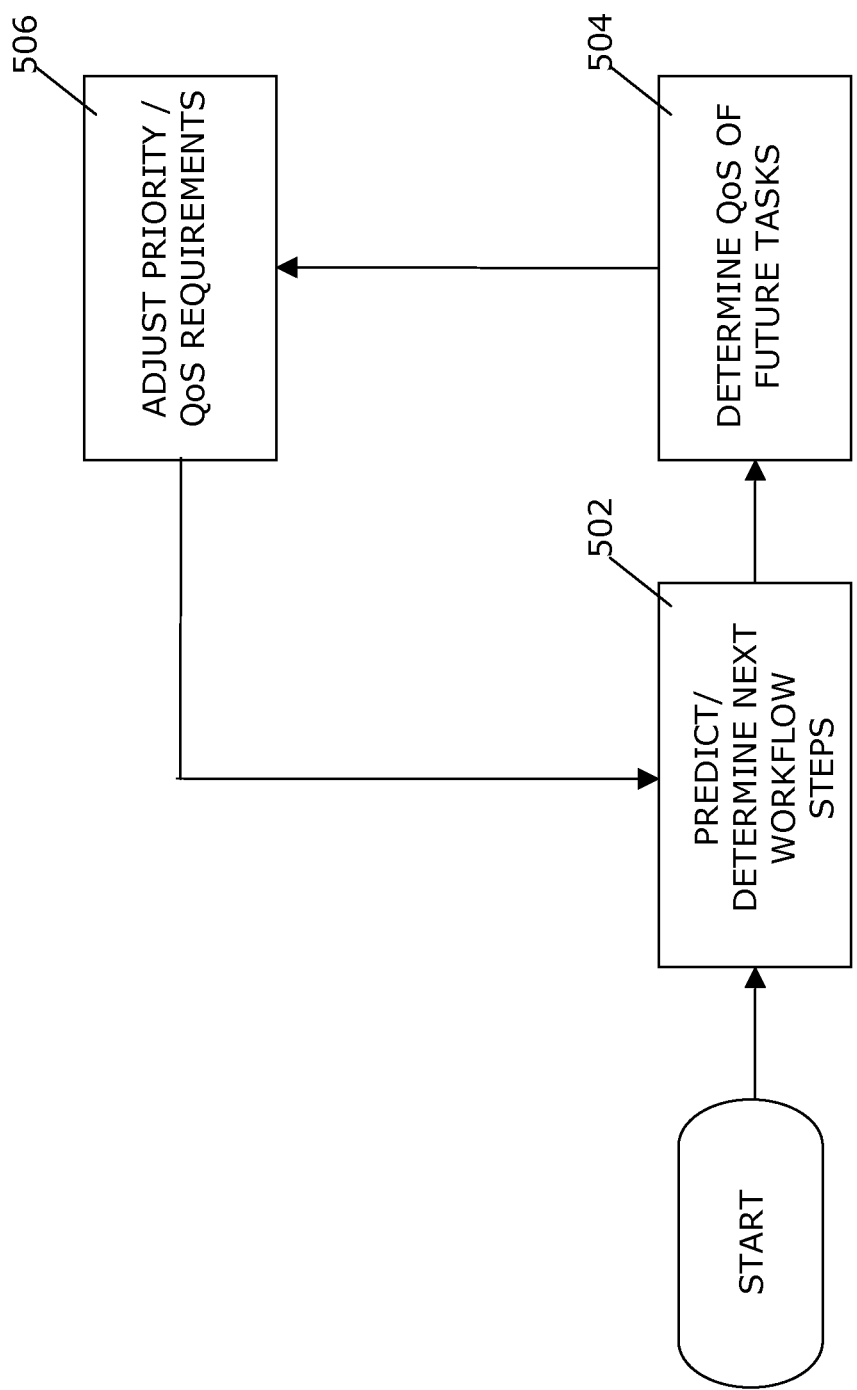
FIG. 5 schematically illustrates steps of a parallel process which, in embodiments of invention, is employed to make adjustments from one business process execution to the next.

FIG. 5 schematically illustrates steps of a parallel process which, in embodiments of invention, is employed to make adjustments from one task to the next. Essentially, the steps of FIG. 5 take place between individual tasks e.g. A and B and C (see FIG. 3). In a typical system, a number of instances of the same workflow at different state and different tasks with varying priorities are to be executed. Essentially, the steps of FIG. 5 determine or predict the priority of the next step based on all the steps to be executed next.

First, a determination is made of next workflow steps (502). Thence, the QoS of future tasks is determined (504) and priority/QoS requirements are adjusted (506). More precisely, session parameters are dynamically adjusted as per any requirements identified and also based on input from business-related middleware (as, e.g., resides in data centers to manage overall workflow executions). Based on a current step and a future predicted step, parameters are dynamically provisioned as appropriate for workflow sessions. In an example embodiment of the invention, an audit trail is also maintained of the workflow execution based on the steps and their attributes that are identified. With parallel reference to FIG. 3, the actor DB (database) 302a, service DB 302b, DAG 303 and node (A/B/C/D) attributes are updated based on learning from monitoring the business process sessions. Generally, thereafter, it will be appreciated that pertinent business actions can continue to be undertaken in ensuing processes when an event is detected and a "detect events" triggers is sent to a business and service layer.

By way of further appreciating and understanding embodiments of the invention, it should be noted that a network session typically includes control plane and data plane sub sessions. The control plane sub session has the necessary signaling mechanisms for QoS, mobility etc associated with the session and the data plane carries the actual payload. The control plane and data plane can be separate or combined. Generally, in accordance with at least one embodiment of the invention, events are detected from inspecting both the control plane and data plane of the underlying session.

Here below are three example scenarios that may be carried out in accordance with embodiments of the invention. The scenarios relate to an automotive manufacturing yard with cars destined for outbound destinations. Mobile Stations correspond to workers accessing and moving the vehicles. (Particularly, cars are manufactured and shipped by truck to a parking lot to be transported onward.) During this process, the car is checked for any known faults/defects and if no faults are found, they are parked for onward transportation. in the present example, truck drivers take pictures/videos of the cars as proof of no known visual defects and also ID the car and its location to retrieve the car later during transportation. Abbreviations include: BSID=Base Station ID; MS=Mobile Station.

By way of brief elaboration, in Scenario 1, based on the actor and the location of the actor, the step of workflow is detected. A truck driver, upon reaching a parking lot, uploads the image of a car to the central server to certify the nonexistence of any visual defects. In Scenario 2, based on the service end point, the user is trying to view the vehicles that are already in the parking lot. In Scenario 3, video is uploaded. This event is compared with the workflow steps uploading the video along with the previous steps identified with the session are compared with the workflow DAG to identify/prune the actual task being executed.

Scenario 1:
Detected Event A: Event <MSID1, *, *, *, *, BSID2>
MSID1 is Device id of Van driver Parking the vehicle
BSID2 is the parking lot
Inference: Upload bandwidth needed to upload the image and place of location
Obtained from Actor to task DB
Obtained from Hand off event for the MS
Scenario 2:
Detected Event B: <MSID2, *, *, Service-endpoint, *, BSID1>
Service-endpoint: http://xyz.com: 8023/viewVehicles.svc?wsdl
Inference:
User trying to view all vehicles in the lot
Need bandwidth to download images of vehicles parked in the lot
Scenario 3:
Detected Event C: <MSID1, *, *, *, Video, *, BSID/Loc>
Based on the active workflow instances:
prune the steps of the workflow that transfers the video;
based on the previous tasks detected, identify the current task;
(Scenario 3 represents essentially a finite state machine based on the previous tasks detected and the current payload type and consistent with the DAG representation of the business process.)

Figure 6:
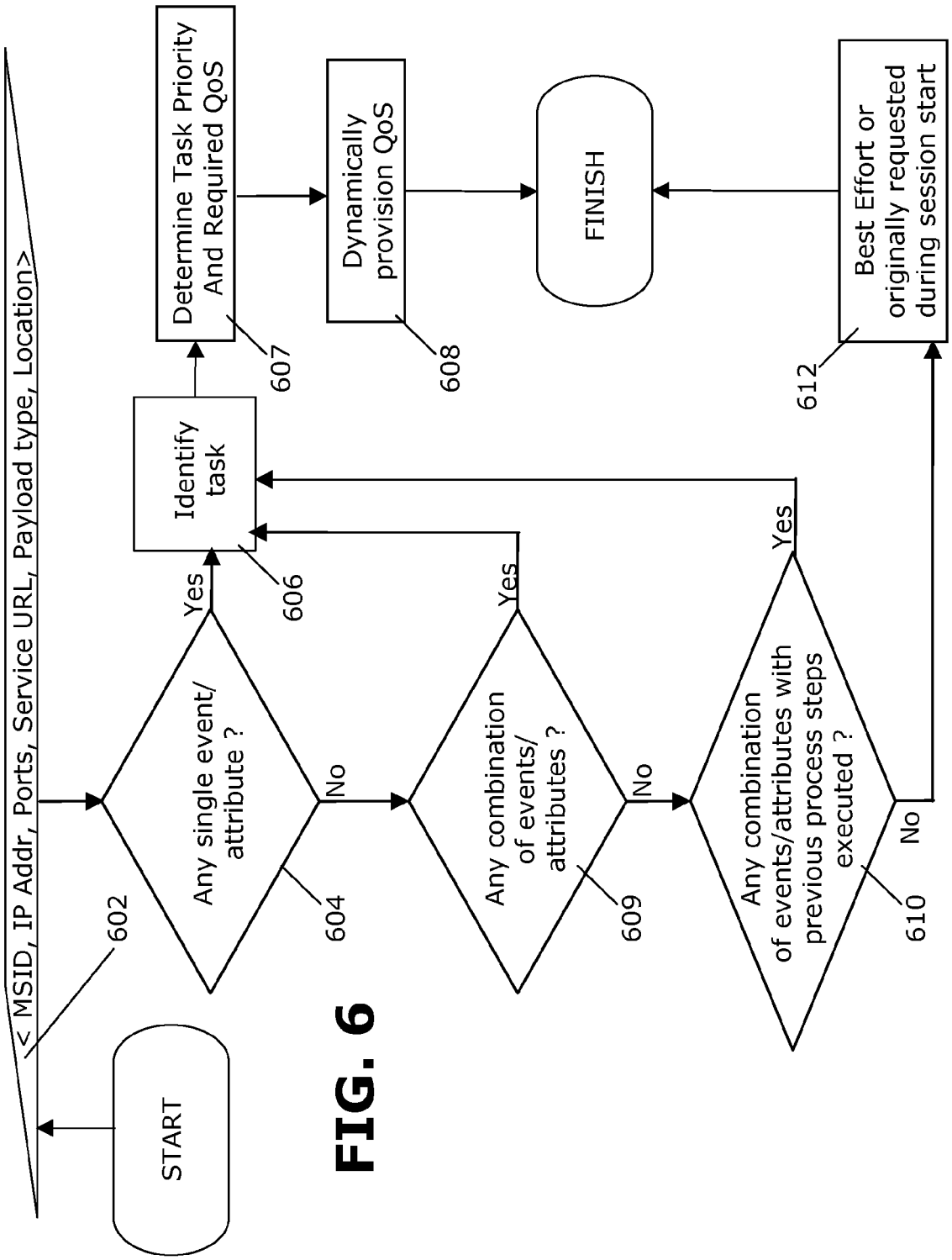
FIG. 6 schematically depicts a process of event detection and identification in accordance with at least one embodiment of the invention.

FIG. 6 schematically depicts a process of event detection and task identification in accordance with at least one embodiment of the invention. First, an event 602 is detected. If it is a single event or attribute (604), the corresponding task is identified (606), task priority and required QoS are determined (607) and QoS is dynamically provisioned (608). Otherwise, if a combination of events or attributes is detected (609), the corresponding task is identified (606), task priority and required QoS are determined (607) and QoS is dynamically provisioned (608). Otherwise, if a combination of events or attributes is detected with previous process steps having been executed for them (610), the corresponding task is identified. Finally when corresponding tasks not identified by any of the above steps, a Best Effort is undertaken or the events/attributes are originally requested during a workflow session start (612). ("Best Effort" is one of the known scheduling [resource management] classes. When a session or traffic is assigned to a Best Effort class, then no special provisioning or arrangements are made to that specific session. Based on the availability of resources, the session is allotted appropriate resources [in a fair or round robin manner]. This is different from other special allocation techniques, where some guarantee might be provided on the allocation of resources. In the case of Best Effort allocation, no guarantees are provided and the resources are allocated as they become available.)

Figure 7:
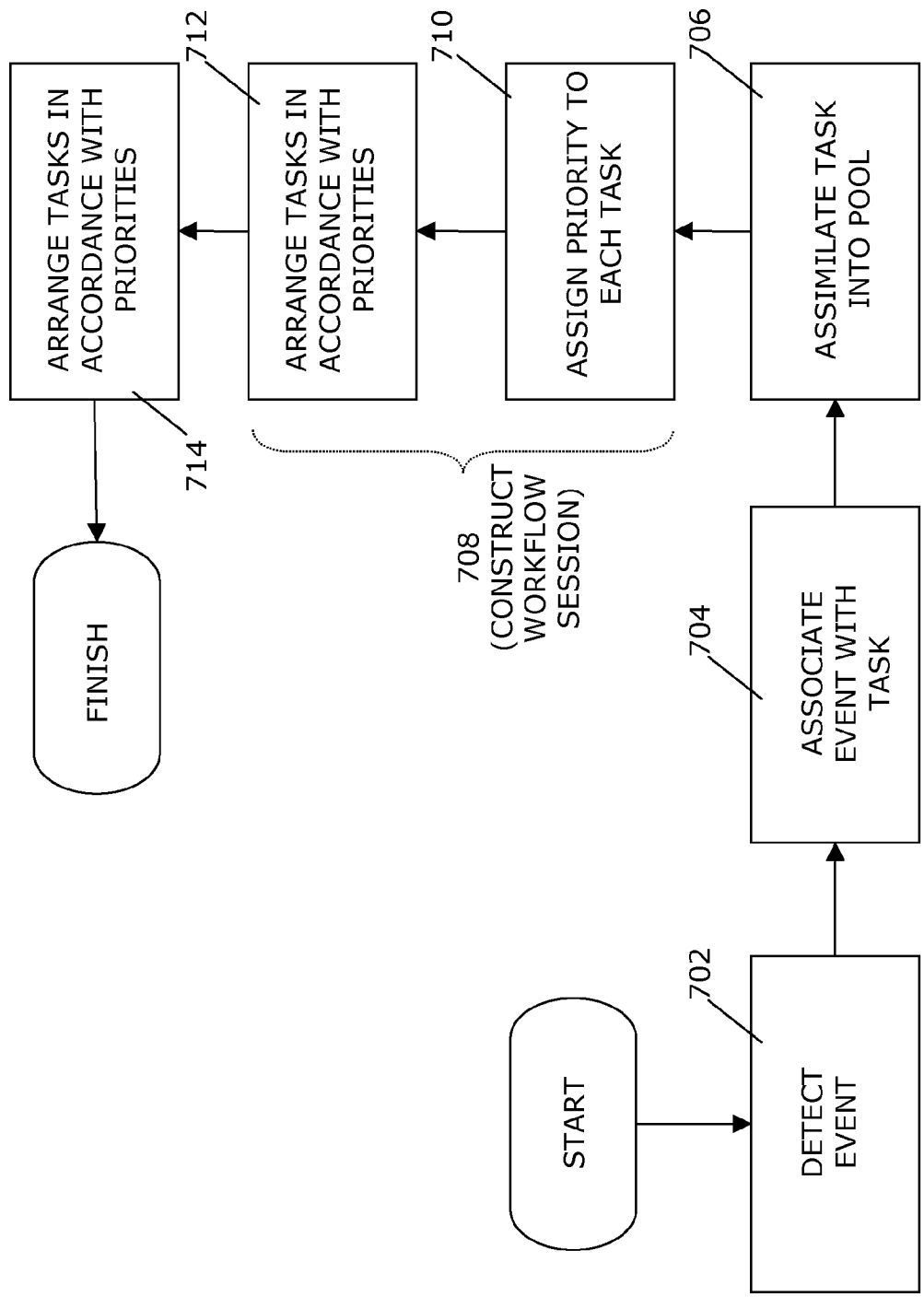
FIG. 7 sets forth a process more generally for managing business process execution in accordance with at least one embodiment of the invention.

FIG. 7 sets forth a process more generally for managing business process execution in accordance with at least one embodiment of the invention. It should be appreciated that a process such as that broadly illustrated in FIG. 7 can be carried out on essentially any suitable computer system or set of computer systems, which may, by way of an illustrative and on-restrictive example, include a system such as that indicated at 100 in FIG. 1. In accordance with an example embodiment, most if not all of the process steps discussed with respect to FIG. 7 can be performed by way of system processors and system memory such as those indicated, respectively, at 42 and 46 in FIG. 1.

As shown in FIG. 7, an event is detected (702) and the event is associated with a task (704). The task is assimilated into a pool of tasks (706). A workflow session is constructed respective to the pool of tasks (708), with priority being assigned to each task (710) and the tasks being arranged in accordance with the priorities (712). Thence, data are accommodated as learning for future workflow sessions (714).

Generally, optimization or prioritization can take place in accordance with any of a variety of criteria. For instance, tasks employing similar media may be grouped or executed together while, among similar media, the priority of the task to be executed is determined (in accordance with at least one embodiment of the invention) based on the current step of the workflow and the input task priorities.

It should be noted that aspects of the invention may be embodied as a system, method or computer program product. Accordingly, aspects of the invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the invention may be written in any combination of one or more programming languages, including an object oriented programming language such as Java®, Smalltalk, C++ or the like and conventional procedural programming languages, such as the "C" programming language or similar programming languages. The program code may execute entirely on the user's computer (device), partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the invention are described herein with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

This disclosure has been presented for purposes of illustration and description but is not intended to be exhaustive or limiting. Many modifications and variations will be apparent to those of ordinary skill in the art. The embodiments were chosen and described in order to explain principles and practical application, and to enable others of ordinary skill in the art to understand the disclosure for various embodiments with various modifications as are suited to the particular use contemplated.

Although illustrative embodiments of the invention have been described herein with reference to the accompanying drawings, it is to be understood that the embodiments of the invention are not limited to those precise embodiments, and that various other changes and modifications may be affected therein by one skilled in the art without departing from the scope or spirit of the disclosure.

What is claimed is:

1. A method comprising:
    detecting an event in a wireless network;
    said detecting comprising identifying an event based on at least one criterion taken from the group consisting essentially of: mobile station ID, physical location of the event, payload type detected, base station ID;
    employing a service appliance in the wireless network to perform:
        associating the event with a task;
        assimilating the task into a pool of tasks; and
        constructing a workflow session respective to the pool of tasks;
    said constructing comprising:
        determining a required quality of service of each task;
        assigning priority to each task via accommodating at least one constraint associated with the wireless network; and
        arranging the tasks in a directed acyclic graph in accordance with required quality of service, assigned priority and at least one of: payload size, media type and timeout;

identifying data subsequent to the workflow session and an expected quality of service requirement for the subsequent data; and adjusting, using upon the directed acyclic graph, at least one parameter of the wireless network based upon the identified subsequent data and expected quality of service requirement.

2. The method according to claim 1, wherein said assigning comprises grouping tasks employing similar media.

3. The method according to claim 1, wherein each task is associated with an actor in the wireless network.

4. The method according to claim 1, wherein said accommodating comprises predicting subsequent workflow steps.

5. The method according to claim 1, wherein said accommodating further comprises adjusting priority of subsequent workflow steps.

6. An apparatus comprising:
one or more processors; and
a computer-readable storage medium having computer-readable program code embodied therewith and executable by the one or more processors, the computer-readable program code comprising:
computer-readable program code configured to detect an event;
wherein detecting comprises identifying an event based on at least one criterion taken from the group consisting essentially of: mobile station ID, physical location of the event, payload type detected, base station ID;
computer-readable program code configured to associate the event with a task;
computer-readable program code configured to assimilate the task into a pool of tasks;
computer-readable program code configured to construct a workflow session respective to the pool of tasks via:
determining a required quality of service of each task;
assigning priority to each task via accommodating at least one constraint associated with the wireless network; and
arranging the tasks in a directed acyclic graph in accordance with required quality of service, assigned priority and at least one of: payload size, media type and timeout;
computer-readable program code configured to identify data subsequent to the workflow session and an expected quality of service requirement for the subsequent data; and
computer-readable program code configured to adjust, using upon the directed acyclic graph, at least one parameter of the wireless network based upon the identified subsequent data and expected quality of service requirement.

7. A computer program product comprising:
a computer-readable storage medium having computer-readable program code embodied therewith, the computer-readable program code comprising:
computer-readable program code configured to detect an event;
wherein detecting comprises identifying an event based on at least one criterion taken from the group consisting essentially of: mobile station ID, physical location of the event, payload type detected, base station ID;
computer-readable program code configured to associate the event with a task;
computer-readable program code configured to assimilate the task into a pool of tasks;
computer-readable program code configured to construct a workflow session respective to the pool of tasks via:
determining a required quality of service of each task;
assigning priority to each task via accommodating at least one constraint associated with the wireless network; and
arranging the tasks in a directed acyclic graph in accordance with required quality of service, assigned priority and at least one of: payload size, media type and timeout; and
computer-readable program code configured to identify data subsequent to the workflow session and, an expected quality of service requirement for the subsequent data; and
computer-readable program code configured to adjust, using upon the directed acyclic graph, at least one parameter of the wireless network based upon the identified subsequent data and expected quality of service requirement.

8. The computer program product according to claim 7, wherein said computer-readable program code is configured to group tasks employing similar media.

9. The computer program product according to claim 7, wherein each task is associated with an actor in a wireless network.

10. The computer program product according to claim 7, wherein said computer-readable program code is further configured to predict subsequent workflow steps.

11. The computer program product according to claim 7, wherein said computer-readable program code is further configured to adjust priority of subsequent workflow steps.

* * * * *